United States Patent [19]

Gründken et al.

[11] Patent Number: 4,733,771
[45] Date of Patent: Mar. 29, 1988

[54] CONNECTION DEVICES FOR INTERCONNECTING THE PANS OF SCRAPER-CHAIN CONVEYORS

[75] Inventors: Dieter Gründken; Manfred Redder, both of Lünen, Fed. Rep. of Germany

[73] Assignee: Gewerkschaft Eisenhutte Westfalia GmbH, Lunen, Fed. Rep. of Germany

[21] Appl. No.: 78,606

[22] Filed: Jul. 28, 1987

[30] Foreign Application Priority Data

Aug. 20, 1986 [DE]  Fed. Rep. of Germany ....... 3628207

[51] Int. Cl.$^4$ .............................................. B65G 19/28
[52] U.S. Cl. ................................... 198/735; 198/860.2
[58] Field of Search ................... 198/735, 860.2, 861.2

[56] References Cited

U.S. PATENT DOCUMENTS 3,583,552  6/1971  Renwick .............................. 198/735
4,157,751  6/1979  Grundken et al. ................... 198/735
4,282,968  8/1981  Temme ................................. 198/735
4,560,059 12/1985  Braun et al. ......................... 198/735
4,607,890  8/1986  Merten et al. ................... 198/735 X Primary Examiner—Robert J. Spar
Assistant Examiner—D. Glenn Dayoan
Attorney, Agent, or Firm—Sughrue, Mion, Zinn, Macpeak and Seas

[57] ABSTRACT

The pans of a scraper-chain conveyor are interconnected by way of a dog-bone type connector with enlarged end regions and a central shank which fits into shaped compartments in the side walls of adjacent pans. A hook-like projection on one of the end regions engages in a recess adjoining one of the pockets and a complementary web-like projection on the other end region lies in an opening adjoining the other of the pockets. A swivelling locking plate is fitted to the side wall to overlap the web-like projection and retain the connector in place.

18 Claims, 9 Drawing Figures

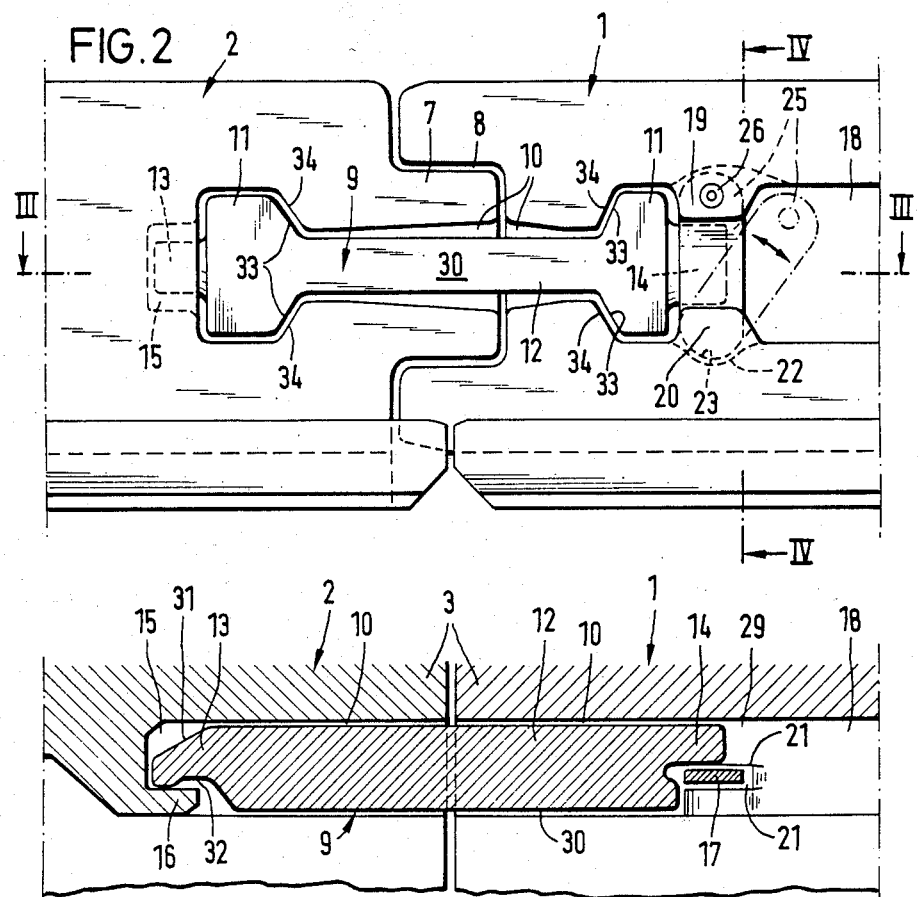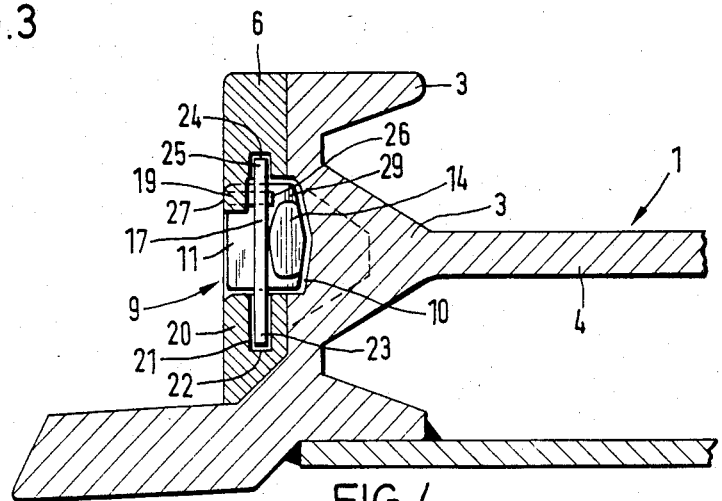

CONNECTION DEVICES FOR INTERCONNECTING THE PANS OF SCRAPER-CHAIN CONVEYORS

BACKGROUND TO THE INVENTION

1. Field of the Invention

The present invention relates in general to scraper-chain conveyors for use in underground mineral mining installations and, more particularly, the invention is concerned with connection means and devices used to connect the individual channel sections or pans of the conveyor together.

2. Description of Prior Art

It is known to use a variety of devices to connect the adjacent ends of the channel sections of scraper-chain conveyors together. The main objective of these connection devices is to permit a certain limited degree of angular mobility between the ends of the channel sections in both horizontal and vertical senses while resisting tensile forces tending to draw the ends apart. The devices not only have to resist tensile forces but they also need to withstand other forces when the conveyor is shifted in the so-called 'snaking' movement by rams which advance the conveyor over sections and when a winning machine passes along the conveyor. The inevitable unevenness in the floor of the mine working often aggravates the situation and results in increased stress in the components of the connecting devices. Hitherto, particularly satisfactory performances has been provided by using the so-called 'dog-bone' type coupling which fits into shaped compartments in the end regions of the channel sections with a certain degree of free play. These known couplings are then retained in the compartments by releasable locking devices of various kinds. Typical prior art constructions are described in U.S. Pat. No. 4,157,751, German Patent Specifications Nos. 1 937 018 and 2 826 023 and German Utility Model No. 82 07 596.

The present invention seeks to provide an improved form of connection means of the known type.

SUMMARY OF THE INVENTION

Connection means constructed in accordance with the invention comprises a coupling member with a central shank and enlarged heads at the opposite ends of the shank—resembling a dog bone—which fit into laterally-open compartments provided in the end regions of the side walls of adjacent channel sections of a scraper-chain conveyor. In accordance with the invention, opposed wall portions adjoin one of the compartments and means, such as a pocket, in at least one of these wall portions provides a swivel bearing for a locking member, such as a plate or bolt. The locking member can be swivelled on the swivel bearing across the coupling member to retain the latter in the compartments and a detachable device secures the member in this retention position. When released, the locking member can be swung away from the coupling member to permit withdrawal of the coupling member. This provides a simple yet more reliable way of fixing the coupling member in place. The locking member can be easily handled, inserted and released.

Preferably, the coupling member has projections on the heads one of which engages in hook-like fashion in an aperture in an end wall of one of the compartments and the other of which is retained by the locking member which simply overlaps the projection without necessitating devices fitted around behind the coupling member. This permits considerable tolerances in the dimensions of the compartments and the coupling member can have an extended range of axial displacement within the compartments without affecting the retention means.

The shank of the coupling member can have a rectangular cross-section with rounded corners. The heads of the coupling member may be of generally triangular configuration with inclined faces over transition zones where they merge with the shank. These faces can then be engaged with similarly inclined surfaces of the compartments to limit the axial displacements. The projections are smaller than the heads and are preferably offset from outermost lateral surfaces of the heads. The projection associated with the locking member is larger in height than the hook-shaped opposite projection to present an adequate counter surface to the locking member. Instead of having a swivelling locking member at just one end of the coupling member it is possible to have such members at both ends. This would necessitate a symmetrical coupling member and the hook-like projection at one end is obviated.

To release the coupling member, the locking member in question can be released from its retention position and swung about the swivel bearing into an opening adjoining the adjacent compartment and out of range of the coupling member. Conveniently, the pocket is a slot with a curved support surface in a lowermost one of the wall portions. A complementary slot in the uppermost wall portion can be provided to receive the locking member when this is swivelled in an upright position to retain the coupling member. The locking member can be shaped to possess curved ends which match curved inner surfaces of the slot. The uppermost wall portion and the locking member can have alignable bores which receive a simple pin or sleeve used to secure the locking member in the retention position. When it is desired to release the locking member, the fixing element, i.e. the pin or sleeve, can be driven into the bores to enter a clearance space behind the upper wall portion. This then allows the locking member to be swivelled away from the coupling member.

It is desirable additionally to construct the end regions of adjacent side walls of the channel sections with complementary projections and recesses resembling mortice joints.

In some circumstances it is desirable to have different ranges of free play in the connection means in the axial and transverse directions as, for example, between different types of conveyors and mining installations or with the use of anciliary equipment. This can be achieved quite easily by the connection means of the invention by having coupling members of different dimensions without otherwise altering the standard compartments or pans.

The invention may be understood more readily and various other aspects and features of the invention may become apparent from consideration of the following description.

BRIEF DESCRIPTION OF DRAWINGS

An embodiment of the invention will now be described, by way of example only, with reference to the accompanying drawings, wherein:

FIG. 2 is a schematic elevation of the connection means shown in FIG. 1;

FIG. 3 is a sectional plan view taken along the line III—III of FIG. 2;

FIG. 4 is a sectional end view taken along the line IV—IV of FIG. 2;

DESCRIPTION OF PREFERRED EMBODIMENT

Figure 1:
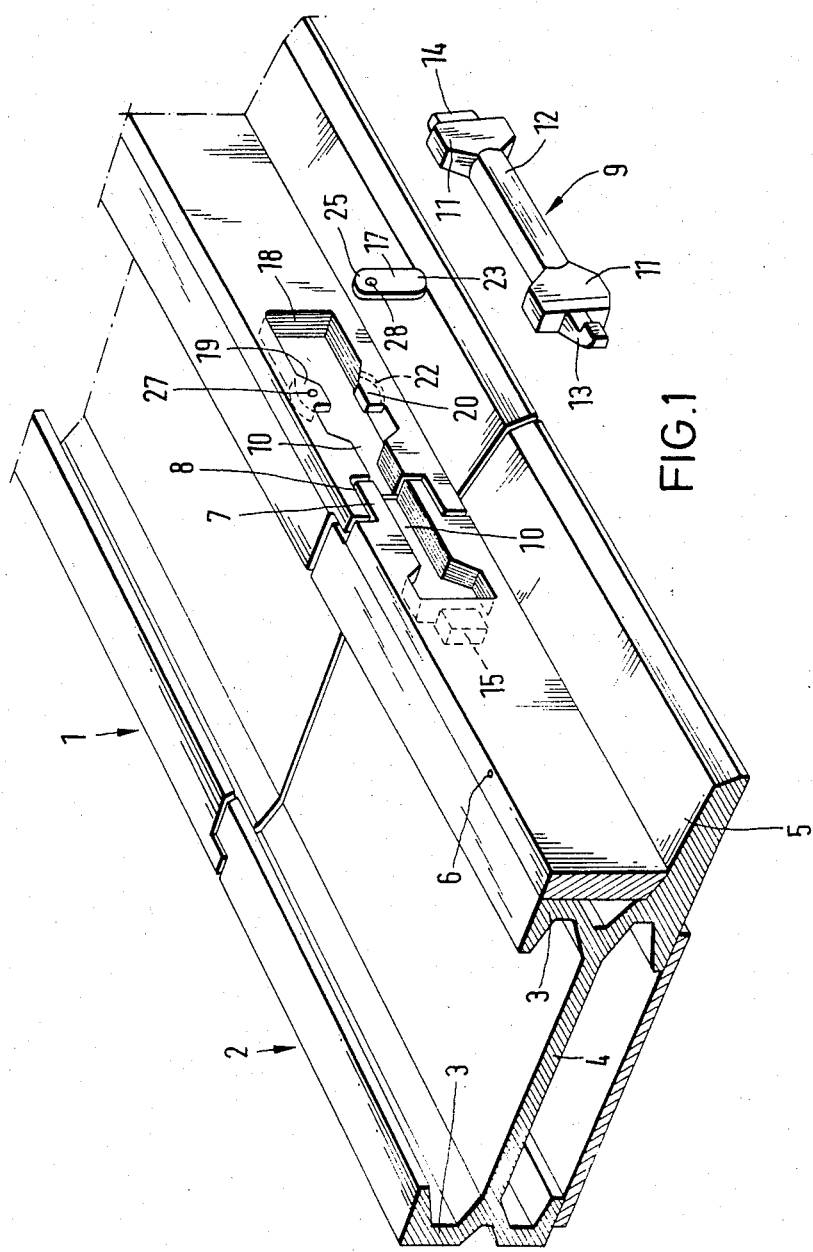
FIG. 1 is a perspective and exploded view of the end regions of two channel sections of a scraper-chain conveyor connected together with connection means in accordance with the invention.
Figure 5:
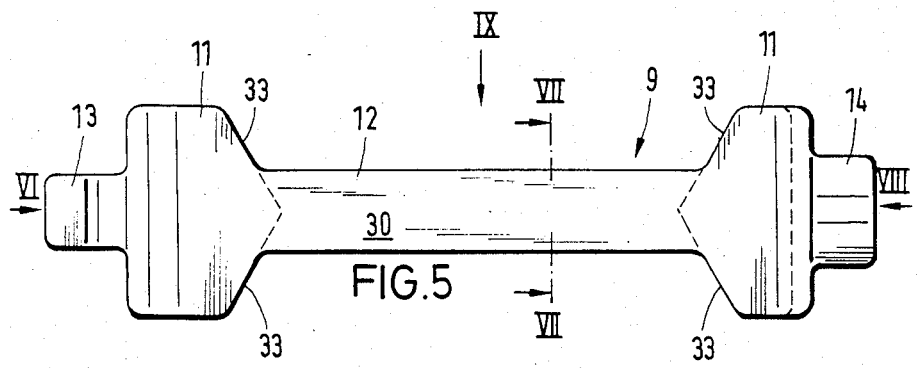
FIG. 5 is an elevation of the coupling member of the connection means shown in FIGS. 1 to 4, the view being taken on a somewhat larger scale to the other Figures.
Figures 6, 7, 8:
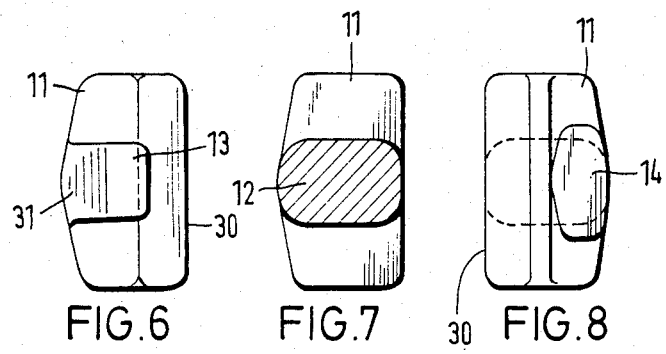
FIG. 6 is an end view of the coupling member taken in the direction of arrow VI of FIG. 5.
FIG. 7 is a cross-section of the coupling member taken along the line VII—VII.
FIG. 8 is an end view of the coupling member taken in the direction of arrow VIII—VIII of FIG. 5.

In known manner, a scraper-chain conveyor is composed of a series of channel-sections or pans disposed end-to-end. The individual pans are each composed of a pair of side walls of generally sigma-shaped cross-section interconnected by a floor plate. In FIG. 1, the adjacent end regions of two pans 1, 2 are shown with the side walls of the pan 2 designated 3 and the floor plate designated 4. In the illustrated construction, the lower run of the conveyor is closed off by base plates extending between the lower flanges of the side walls 3 of the pans. A rail 5 extends outwardly from the lower flange of each side wall 3 adjacent the mineral face (not shown) to form a guide or support for a mineral winning machine such as a plough. As illustrated the rail 5 is integral with the lower flange but the rail 5 can be on a separate component. A reinforcement bar 6 is also fitted to the exterior of each mineral-face side wall and this bar 6 can be united with the rail 5 as an L-shaped structure. A similar reinforcement bar 6 can be fitted to the opposite side wall in the goaf-side wall. The bars 6 can be integral with the side walls 3 in which case the side walls are preferably castings.

In order to interconnect the adjacent pans to permit the necessary limited articulation therebetween connection means is provided as will now be described. As shown in FIGS. 1 and 2, one of the pan side wall end regions is formed with a projection 7 and the other of the pan side wall end regions is formed with a corresponding recess 8. The end regions thus interengage in the manner of a mortice joint with a certain free play. In order to connect the pans together to resist traction or tensile forces while permitting some angular displacement about vertical and horizontal planes a coupling member or toggle bolt 9 is fitted into laterally-open compartments 10 in the side walls 3 or the reinforcement bars 6. The compartments 10 extend through the joints 7, 8 and are shaped to receive the member 9 with a certain degree of play in both the axial and transverse directions. As shown in FIGS. 1 and 2, the member 9 has a somewhat H-shaped contour with enlarged end bodies or heads 11 of generally triangular shape interconnected by a shank or stem 12 of reduced cross-section. The heads 11 are further provided with integral stud or web-like projections 13, 14 of different shape. When the member 9 is installed, the projection 13 engages in an aperture 15 in an end wall of the associated compartment 10 in a hook-like fashion. The aperture 15 is closed off from the exterior by a wall portion 16 as shown in FIG. 3. The projection 14 at the opposite end of the bolt 9 is trapped with the aid of a detachable locking member in the form of a swivel bolt or plate 17. As shown in FIGS. 1 to 3, the compartment 10 associated with the head 11 having the projection 14 communicated with a lateral rectangular opening 18. Tongue-like wall portions 19, 20 are located at the transition zone between the compartment 10 and the opening 18. In both the wall portions 19, 20 there are slots 21, 24 for receiving the plate 17. The apex and base of the respective slots 24, 21 are curved to engage with convex upper and lower ends 23 of the plate 17. The plate 17 can be located in the lower slot 21 with its lower end 23 supported for rolling on the base surface 22 of the slot 21 as shown in FIGS. 2 and 4. The plate 17 can thus be held captive within the lower slot 21 for swivelling in a plane parallel to the bar 6 as indicated in FIG. 2. When the plate 17 is swivelled to an upstanding position to engage in the slot 24 the plate 17 overlaps the projection 14 to trap the latter in the opening 18 and retain the coupling member 9 in the compartments 10. To reliably secure the plate 17 in the upstanding position a locking element in the form of a simple sleeve or pin 26 is driven into aligned bores 27, 28 in the wall portion 19 and the plate 17 from the exterior. As shown in FIG. 4, a region at the rear of the wall portion 19 inwardly of the slot 24 is cut away to merge with the longitudinal V-shaped groove running along the side wall 3 to provide a clearance space 29 behind the element 26. This permits the element 26 to be driven in through the bores 27, 28 with a suitable tool to clear the bore 27. This then allows the plate 17 with the element 26 to be swivelled sideways out of the slot 24 and into the opening 18 as indicated in FIG. 2. If desired, the plate 17 can be withdrawn from the slot 21. With the plate 17 swung to an inoperative position the member 9 is then capable of being removed from the compartments 10 by pivoting the head 11 with the projection 14 outwardly and displacing the member 9 longitudinally to withdraw the projection 13 from the aperture 15. The sequence is reversed when the member 9 is fitted in place.

Figure 9:
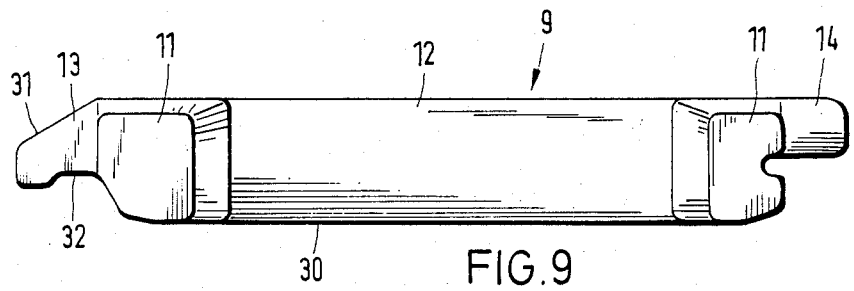
FIG. 9 is a plan view of the coupling member taken in the direction of arrow IX of FIG. 5.

FIGS. 5 to 9 depict the coupling member 9 in more detail. As shown the member 9 resembles a 'dog-bone'. The stem 12 has a rectangular cross-section with rounded corners while the enlarged heads 11 merge with the stem 12 with inclined shoulder surfaces 33 which mate with corresponding surfaces 34 in the compartments (FIG. 2) to define the limits of axial displacement. The clearance between the respective surfaces 33, 34 thus determines the distance through which the pans 1, 2 can be separated when they are pulled apart. The projections 13, 14 are offset rearwardly from the outer face 30 of the member 9. The projection 13 has a bevelled inclined rear surface 31 so that the projection 13 tapers outwardly from the stem 12. As shown in FIG. 9, the projection 13 has a shallow recess 32 in its front face opposite the face 31 which renders the projection 13 somewhat hook-shaped to permit it to be swung into the aperture 15 when the member 9 is being fitted in place. The projection 14 is somewhat larger in height than the projection 13 (FIG. 5) to provide an adequate counter support surface for the plate 17.

We claim:

1. Means for connecting together two adjacent channel sections of a scraper-chain conveyor, the channel sections each comprising a pair of side walls and a floor plate connected therebetween; the connection means at least including a coupling member having a central shank and enlarged heads at opposite ends of the shank, laterally-open compartments provided in end regions of side walls of the adjacent channel sections and shaped to receive the coupling member, a projection provided on at least one of the heads, an opening defined between wall portions adjoining one of the compartments, a locking plate, means in the wall portions for locating the locking plate for swivelling to overlap the projection and to free the projection and a detachable locking element for securing the locking plate in the position overlapping the projection to retain the coupling member in the compartments.

2. Means for connecting together two adjacent channel sections of a scraper-chain conveyor, the channel sections each comprising a pair of side walls and a floor plate connected therebetween; the connection means at least including a coupling member having a central shank and enlarged heads at opposite ends of the shank, laterally-open compartments provided in end regions of side walls of the adjacent channel sections and shaped to receive the coupling member, opposed wall portions adjoining one of the compartments, a pocket in at least one of the wall portions providing a swivel bearing, a locking member located by the swivel bearing for swinging across the coupling member to retain the coupling member in the compartments and for swinging away from the coupling member to permit its release from the compartments and a detachable device for securing the locking member in the retention position.

3. Connection means according to claim 2, wherein one of the heads of the coupling member is provided with a projection remote from the shank which locates between the wall portions for blocking by the locking member and an opening is provided in the side wall into which the locking member is received for release when it is swung away from the coupling member.

4. Connection means according to claim 2, wherein the pocket is a slot within a lowermost wall portion and a complementary slot is provided in the uppermost wall portion into which the locking member is received in its retention position.

5. Connection means according to claim 2, wherein the locking member is a plate with curved ends and the swivel bearing is a curved surface for abutting one of the curved ends of the plate.

6. Connection means according to claim 4, wherein the slots have curvilinear inner surfaces one of which acts as the swivel bearing and the locking member has curved surfaces corresponding to the inner surfaces of the slots.

7. Connection means according to claim 2, wherein the locking member is a flat plate.

8. Connection means according to claim 2, wherein the detachable securing device is an element in the form of a pin or sleeve engageable in bores in the locking member and in the other of the wall portions.

9. Connection means according to claim 8, wherein a clearance space is provided behind the other of the wall portions into which the element can be driven to release the locking member.

10. Connection means according to claim 2, wherein the coupling member has a projection extending outwardly from one of its heads remote from the locking member and an aperture for receiving the projection is provided in a surface of one of the compartments and is closed to the exterior of the associated side wall.

11. Connection means according to claim 2, wherein the heads of the coupling member have inclined surfaces over transition zones where they merge with the shank and the compartments have similarly inclined surfaces against which the inclined surfaces of the heads can engage.

12. Connection means according to claim 2, wherein the heads of the coupling member each have projections opposite the shank which are reduced in size relative to the heads.

13. Connection means according to claim 12, wherein the projections are offset from outermost lateral surfaces of the heads.

14. Connection means according to claim 13, wherein one of the projections remote from the locking member is generally hook-shaped and an aperture for receiving this one projection is provided in a surface of the compartments and is closed to the exterior of the associated side wall.

15. Connection means according to claim 14, wherein said one projection is tapered and has a rear surface inclined in relation to the longitudinal axis of the coupling member.

16. Connection means according to claim 14, wherein the other projection has a greater vertical dimension than the one projection and the locking member cooperates with this other projection.

17. Connection means according to claim 12, wherein the shank of the coupling member has a rectangular cross-section with rounded corners and the heads are generally triangular.

18. Connection means according to claim 2, wherein the end regions of the adjacent side walls are shaped to possess complementary projections and recesses which interengage in the manner of a mortice joint.

* * * * *